United States Patent [19]

Ikeda

[11] Patent Number: 4,827,731

[45] Date of Patent: May 9, 1989

[54] TEMPERATURE CONTROL MEANS FOR A REFRIGERATING CONTAINER

[75] Inventor: Susumu Ikeda, Moro Isesaki, Japan

[73] Assignee: Sanden Corporation, Japan

[21] Appl. No.: 61,474

[22] Filed: Jun. 15, 1987

[30] Foreign Application Priority Data

Jun. 14, 1986 [JP] Japan .............................. 61-90020[U]
Jun. 14, 1986 [JP] Japan .............................. 61-90023[U]

[51] Int. Cl.$^4$ ............................................. F25D 15/00
[52] U.S. Cl. ....................................... 62/161; 62/237; 236/78 R
[58] Field of Search ................... 236/78 D, 78 R, 94; 364/557; 165/11 R, 26; 62/161, 302, 237

[56] References Cited

U.S. PATENT DOCUMENTS 4,399,428 8/1983 Hughes et al. .................... 62/126 X
4,646,529 3/1987 Hanson .............................. 62/126 X
4,738,117 4/1988 Takasugi ............................... 62/200

FOREIGN PATENT DOCUMENTS 0182723 10/1983 Japan .................................... 236/94

Primary Examiner—William E. Wayner
Attorney, Agent, or Firm—Banner, Birch, McKie & Beckett

[57] ABSTRACT

A temperature control means which is suitable for use with small, transferable refrigerated containers is described. The temperature control means includes a plurality of switches which determine the desired temperature level in the container by switch contact portions provided by the container. The predetermined temperature for controlling the refrigeration in the container is determined by operation of switches which control the refrigerating apparatus by comparing the desired temperature level with the actual temperature in the container.

4 Claims, 3 Drawing Sheets

TEMPERATURE CONTROL MEANS FOR A REFRIGERATING CONTAINER

BACKGROUND OF THE INVENTION

This invention relates to temperature control means, and more particularly, to temperature level determining means for controlling the temperature of transferable containers or boxes which should be maintained under a refrigerated condition.

Generally, when refrigerated merchandise is transported, vehicles provided with a refrigerating container or chamber are used. The interior space of the refrigerated container is normally divided into several compartments, corresponding to the kinds of refrigerated merchandise which should be stored under different temperature conditions. However, sometimes the containers are used to transport merchandise which may be stored under the same temperature conditions. Therefore, some of the refrigerating space of the container is opened causing a wasteful condition.

Furthermore, if the same container is used to transport both refrigerated merchandise and general freight, there is a limit to the kinds of refrigerated merchandise that are able to be transported by the same container.

To overcome the above disadvantages, a refrigerating apparatus which is able to refrigerate a plurality of small transportable containers under different temperature conditions is shown in Japanese Patent Application No. 137283/61. However, in the refrigerating apparatus described in the aforesaid application, determination of the temperature at which each container or box is to be maintained is complicated.

SUMMARY OF THE INVENTION

It is a primary object of this invention to provide a temperature control means in which the temperature condition in each container or box may be easily determined.

It is another object of this invention to provide a temperature control means which comprises a simple element.

According to the present invention, there is provided a temperature control means for a refrigerating container including a plurality of controllable temperature level determining switches, a logic circuit which outputs a selected temperature level signal in accordance with an input signal from said switches, a voltage generating circuit for outputing the predetermined voltage corresponding to the selected temperature level, comparator means for comparing the selected temperature level with the actual temperature detected by a thermal element, and a control element to control the operation of the refrigerating apparatus in accordance with an output signal from the comparator means. The open and close operation of the switches are respectively controlled by the switch contact portions provided on the refrigerating container.

Further objects, features and aspects of this invention will be understood from the following detailed description of the preferred embodiment of this invention with reference to the attached drawings.

DETAILED DESCRIPTION OF PREFERRED EMBODIMENT

Figure 1:
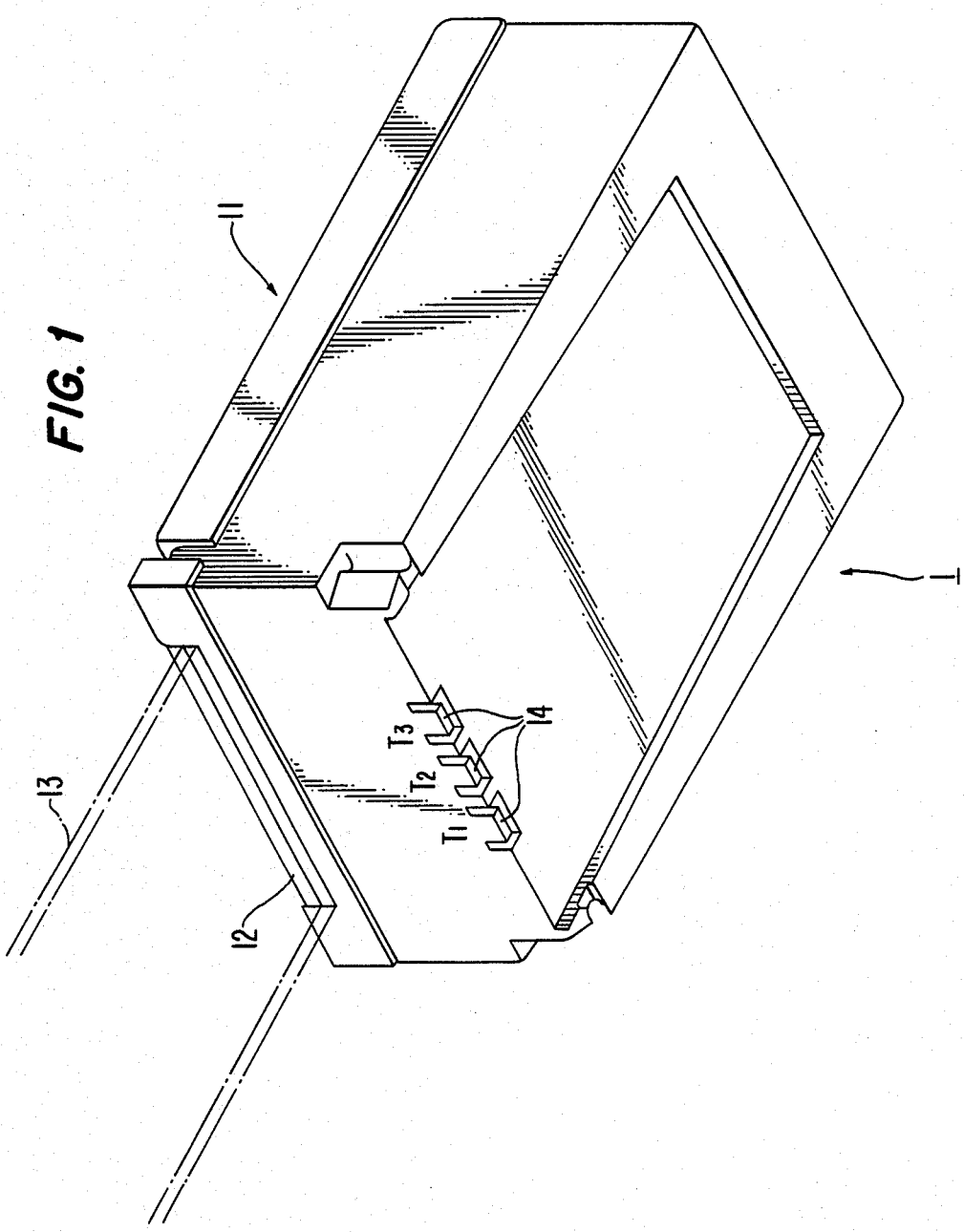
FIG. 1 is a perspective view of a container or box illustrating some features of the controllable temperature level determining means in accordance with the present invention.

Referring to FIG. 1, there is shown a container or box, generally indicated as 1, of which the interior space should be maintained at or under a predetermined temperature. The container 1 comprises a substantially rectangular-shaped, insulated box, indicated generally as 11, with an upper opening and cover plate 12 which covers the upper opening of box 11. The interior space of container 1 is refrigerated by an apparatus which is indicated by dashed lines 13 which extends into the interior space of insulated box 11, to thereby control the temperature condition in the interior space of container 1.

A plurality of cut-out portions 14 are formed on a lower edge portion of container 1 to function as the controller of the temperature determining switches. Each cut-out portion 14 comprises a contact surface for the switches. Therefore, when those cut-out portions contact corresponding temperature switches, the corresponding switches are closed. If the cut-out portions are not in contact with the corresponding switch, the switch is open.

Figure 2:
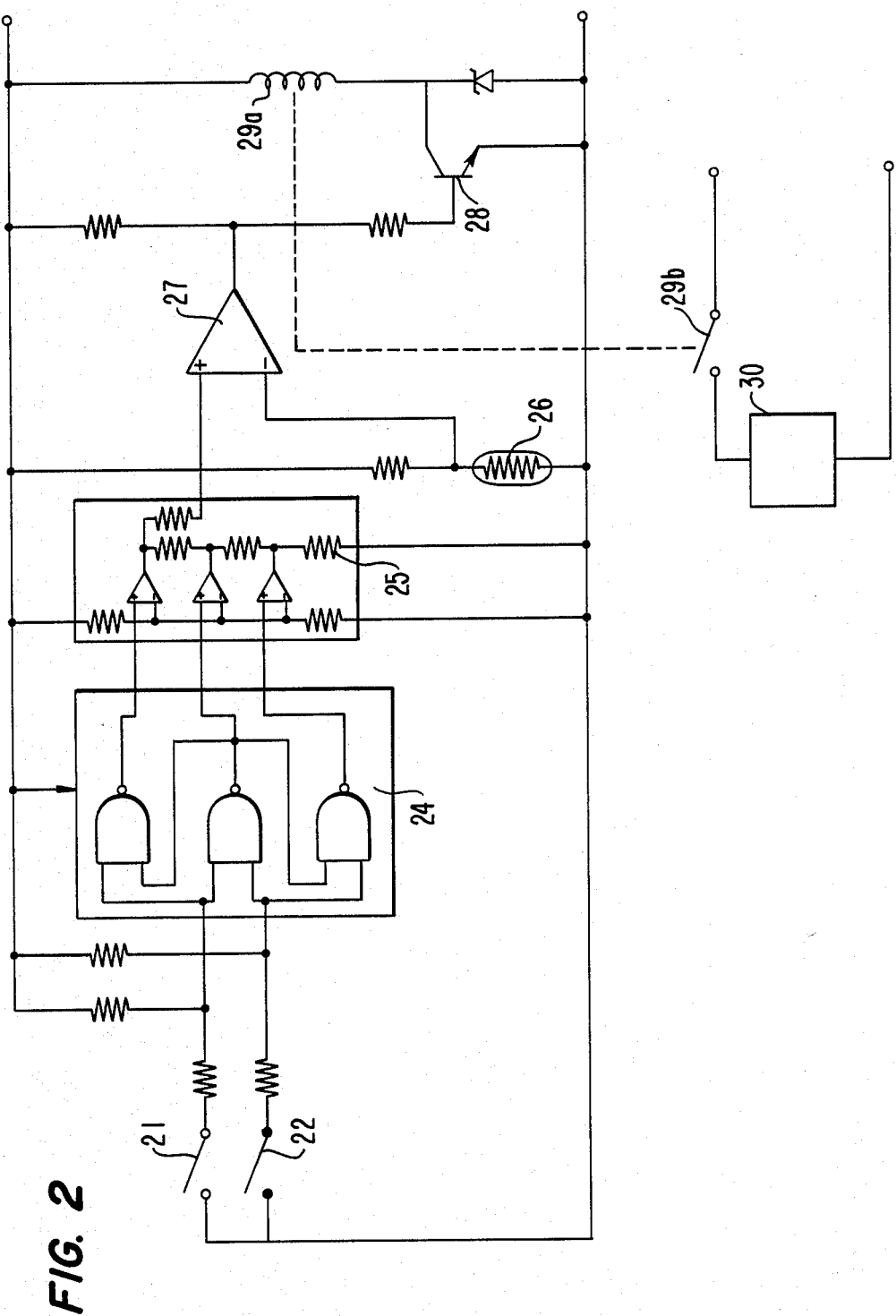
FIG. 2 is a schematic circuit diagram of the temperature control means in accordance with one embodiment of the present invention.

As shown in FIG. 2, the temperature control means of the present invention includes at least two temperature determining switches 21, 22 which are parallel coupled with one another and correspond to cut-out portions 14 of container 1. Both switches 21, 22 are connected with logic circuit 24 which operates in a conventional manner, from which is output the temperature level determining signals in accordance with change of input signals from the switches 21, 22.

According to a preferred embodiment, two switches are used, thereby making it possible to output four signals from logic circuit 24. The output signals represent predetermined temperature level signals, each of which indicates a different temperature level. All output signals from logic circuit 24 are applied to voltage generating circuit 25 by which a predetermined voltage corresponding to the predetermined temperature level is output, in a known manner, in accordance with an output signal from logic circuit 24.

The predetermined voltage output from voltage generating circuit 25 is applied to non-inverting input terminal (+) of comparator 27 to be compared with a variable voltage which represents the actual temperature in container 1. The varying actual voltage is generated by thermistor 26 which is disposed in the interior space of container 1. Thermistor 26 changes its resistance in accordance with a change of temperature. The output signal of comparator 27 controls the energization of transistor 28. Depending on the energization of transistor 28, relay coil 29a of a relay controls the operation of the contact point terminal 29b of the relay to control the control device 30 of the refrigerating apparatus.

Figure 3:
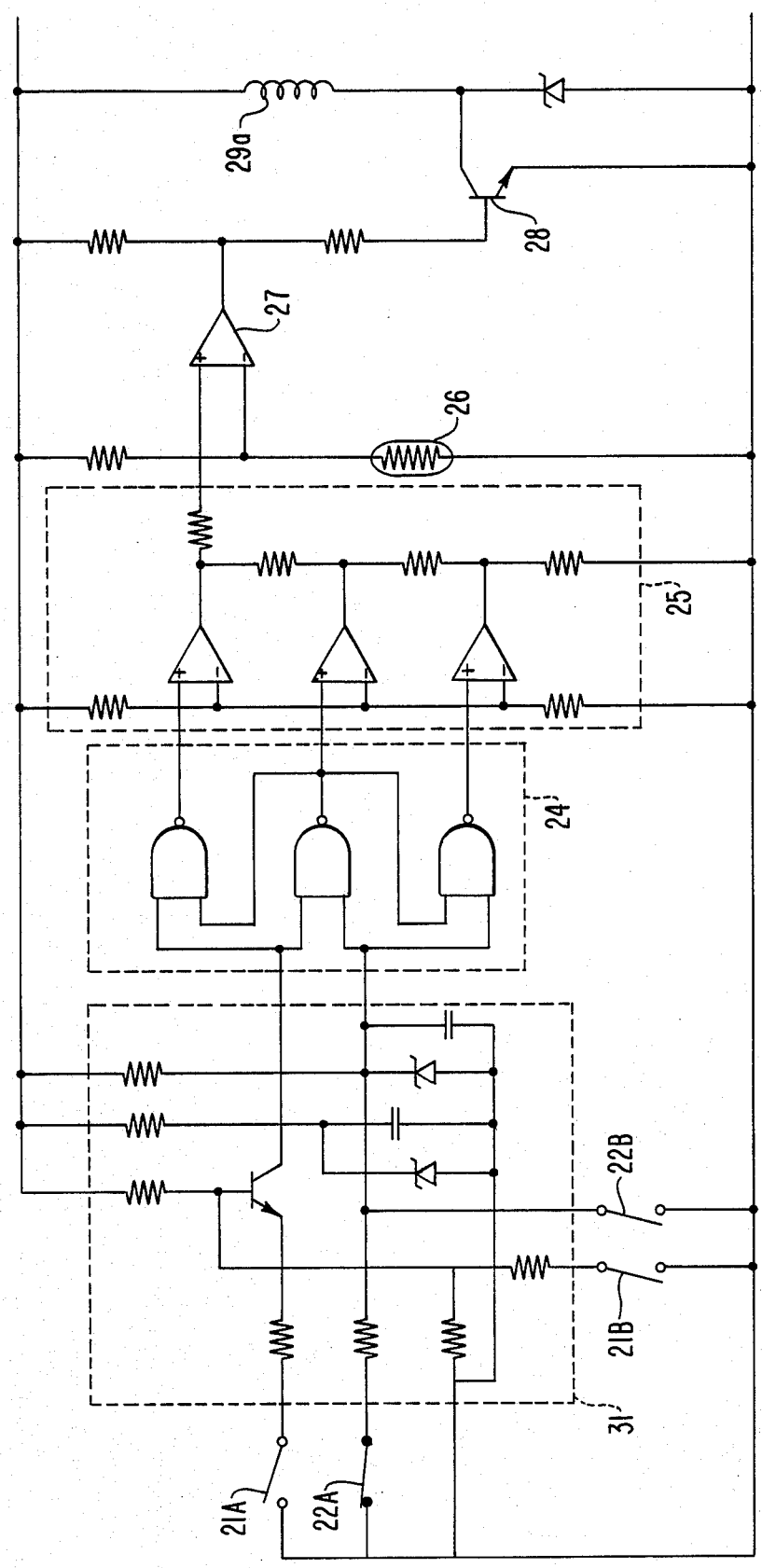
FIG. 3 is a schematic circuit diagram of the circuit of FIG. 2 with a modification in accordance with another embodiment of the present invention.

The circuits of FIGS. 2 and 3 also show various resistors and diodes which are used in the control circuitry in a known manner. A description of these elements is not included here since such is considered unnecessary for one of ordinary skill in the art to understand the invention.

Regarding the operation of the temperature control means, a predetermined temperature level in each container 1 is determined by the open and close state of the temperature determining switches 21, 22. That is, if one of the cut-out portions 14 is not in contact, the corresponding switch, e.g., 21, is open and the other switch, e.g., 22, is closed. The state of the switches is dependent on the operation of cut-out portion 14. Therefore, in this embodiment, four different temperature levels can be selected.

As a result of the input signals due to the open and close condition of switches 21, 22, logic circuit 24 outputs one of the temperature level determining signals. The actual temperature condition in the interior space of container 1 is then compared with the predetermined temperature level, and as a result of the comparison, the refrigerating operation of the container through refrigerating apparatus 13 is controlled to maintain the actual temperature under the predetermined level.

In a preferred embodiment, the container 1 may be pre-cooled before storing the merchandise to prevent drastic temperature changes for the merchandise. The temperature condition in this case is maintained at a temperature just higher than the normal refrigerating condition. Therefore, as shown in FIG. 3, the temperature control means is provided with sub-switches 21b, 22b for determining a pre-cooling temperature level, and the operation of mainswitches 21a, 22a and sub-switches 21b, 22b is controlled by switching circuit 31 which operates in a known manner. In this way, the temperature in the container can be effectively maintained without wasting energy.

This invention has been described in detail in connection with the preferred embodiments. These embodiments, however, are merely for example only and the present invention is not restricted thereto. It will be understood by those skilled in the art that other variations and modifications can be easily made within the scope of this invention as defined in the appended claims.

I claim:

1. A temperature control device for controlling the temperature of a refrigerated container which is cooled by a refrigerating apparatus comprising:

a plurality of temperature level determining switches for selecting a temperature level;

switch contact means provided on said refrigerated container for selectively controlling said temperature level determining switches;

logic means connected to said switches for outputting a signal indicative of said selected temperature level;

voltage generating means for generating a voltage corresponding to said selected temperature level in accordance with the output of said logic means;

comparator means for comparing said selected temperature level with the actual temperature in said container; and control means for controlling said refrigerating apparatus in accordance with the output of said comparator means.

2. The temperature control device as claimed in claim 1 further comprising pre-cooling switches associated with said temperature level determining switches for selectively pre-cooling said container to a predetermined level.

3. The temperature control device as claimed in claim 1 further comprising temperature determining means for determining the actual temperature in said container, wherein said temperature determining means comprises a temperature variable resistor.

4. The temperature control device as claimed in claim 1 wherein said switch contact means comprises cut-out portions provided on said refrigerated container.

* * * * *